United States Patent [19]

Franklin

[11] 4,005,629
[45] Feb. 1, 1977

[54] TRUSS BOLT DRIFT PIN
[76] Inventor: James W. Franklin, P.O. Box 3646, Albuquerque, N. Mex. 87110
[22] Filed: Sept. 22, 1975
[21] Appl. No.: 615,265

Related U.S. Application Data

[63] Continuation of Ser. No. 457,957, April 4, 1974, abandoned, which is a continuation-in-part of Ser. No. 214,699, Jan. 3, 1972, Pat. No. 3,826,057.

[52] U.S. Cl. .................................. 85/1 P; 29/271
[51] Int. Cl.² ........................................ F16B 1/00
[58] Field of Search ............... 85/1 P, 1 R, 1.5 R, 85/35, 32 W, 45; 29/271, 272, 273, 274

[56] References Cited

UNITED STATES PATENTS

| 162,077 | 4/1875 | Kellogg | 85/1 P |
|---|---|---|---|
| 190,224 | 5/1877 | Kromer | 85/45 |
| 1,394,608 | 10/1921 | Davern | 29/271 UX |
| 1,643,112 | 9/1927 | Chisholm | 85/1 P |
| 1,938,153 | 12/1933 | Reeves | 85/32 W |
| 1,971,200 | 8/1934 | Proctor et al. | 85/1 R |
| 2,210,048 | 8/1940 | Swanson | 85/1 R |
| 2,562,352 | 7/1951 | Flynn | 29/271 X |
| 3,270,410 | 9/1966 | Salter et al. | 85/1 R |
| 3,408,887 | 11/1968 | Villo | 85/1 R |
| 3,685,126 | 8/1972 | Kane | 29/271 X |

FOREIGN PATENTS OR APPLICATIONS

| 13,129 | 5/1928 | Australia | 85/1.5 R |
|---|---|---|---|
| 1,338,898 | 4/1963 | France | 85/1 P |
| 1,280,194 | 11/1961 | France | 85/1 R |
| 502,132 | 11/1954 | Italy | 85/1 P |
| 217,412 | 2/1942 | Switzerland | 85/35 |
| 19,265 | 8/1907 | United Kingdom | 85/1 P |

Primary Examiner—Roy D. Frazier
Assistant Examiner—Thomas J. Holko
Attorney, Agent, or Firm—C. B. Messenger

[57] ABSTRACT

Fastener elements are provided for use at selected positions or openings in a composite truss system that is to be used in building construction for form work or permanent installation. The combination truss bolt drift pins proposed herein have shanks of constant cross-section for driven interfit with predrilled holes of truss elements to be joined. The shanks of the bolt pass completely through the elements being joined, and threads of lesser diameter than the shank extend outwardly from the joined elements. The fastener nuts for use with the bolts have a recess at the intended interface with the truss elements that undercut the threads thereof and that is of a size to accommodate a step shoulder of the shank thus assuring full contact of the element holes and the shank component. A drift pin extension for the bolts is of tapering contour from a larger diameter corresponding to the shank diameter to a lesser size providing easy introduction into holes intended for mating alignment. Threads in the drift pin extension are also undercut providing full engagement with fewer turns. The tip ends of the drift pin extensions are of a lesser cylindrical shape whereby the tip of one pin may be engaged in a cross hole that passes transversely through any other drift pin to provide a cooperative wrench type usage during application and removal operations. A bolt coupler having similar tapered and undercut thread features is also provided.

2 Claims, 7 Drawing Figures

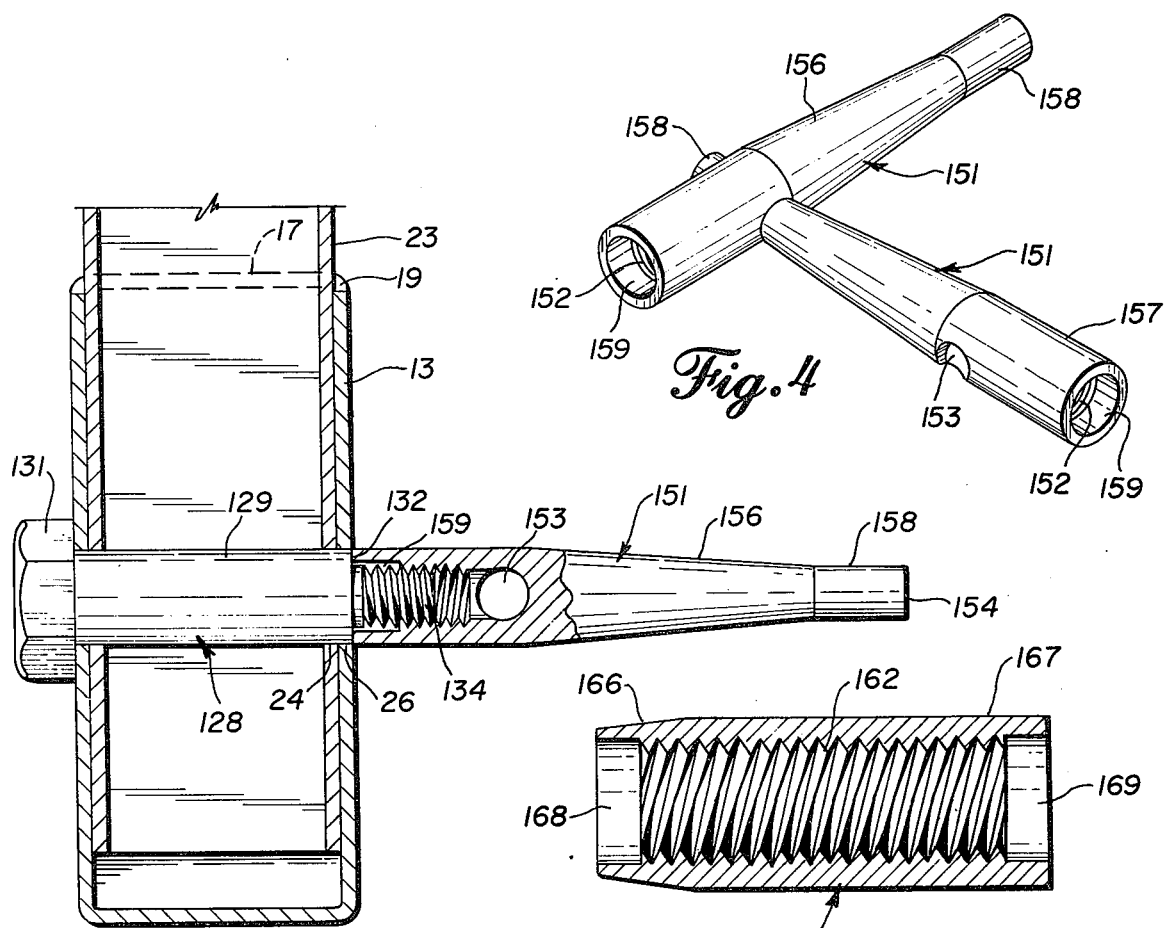
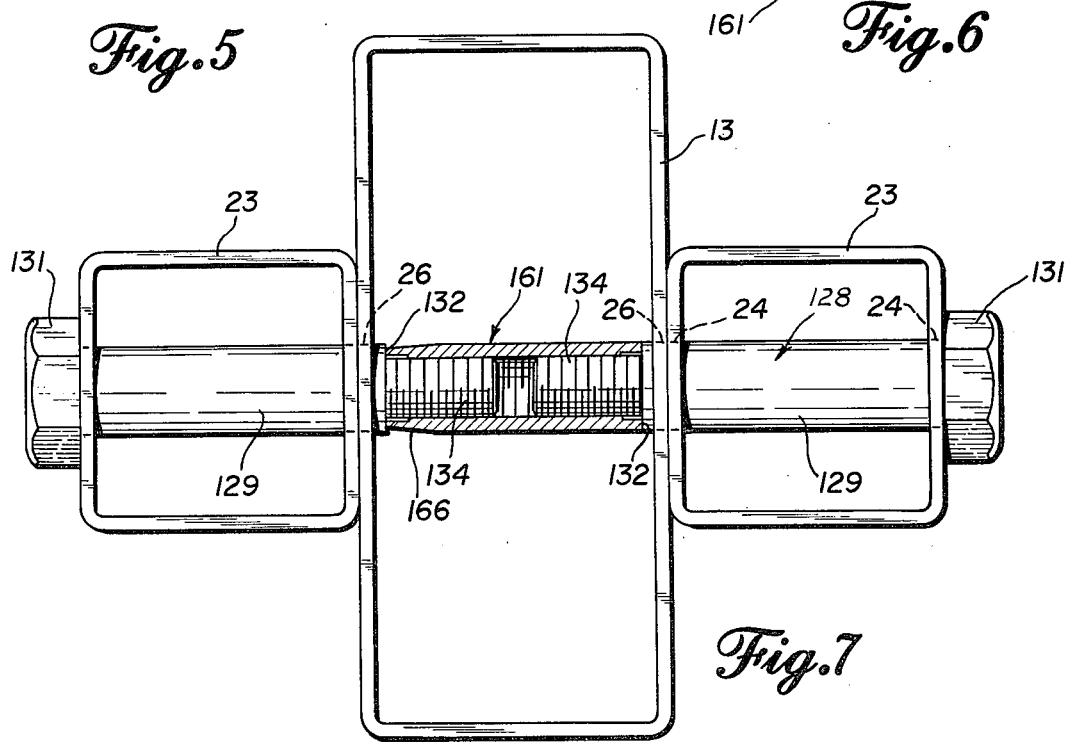

TRUSS BOLT DRIFT PIN

CROSS-REFERENCE TO RELATED APPLICATION

The present application is a continuation of previous application Ser. No. 457,957 filed Apr. 4, 1974, and now abandoned which was itself a continuation-in-part of application Ser. No. 214,699 filed Jan. 3, 1972 now U.S. Pat. No. 3,826,057.

BACKGROUND OF THE INVENTION

Various truss systems have been designed and fabricated previously for use in building construction. A primary use of composite type trusses has been in the construction of buildings as roof and deck supports. It is acknowledged that others have devised and provided components that could be used interchangeably in trusses of different size, length and design strength. Usually such interchangeable components are combined with custom made top and bottom chord elements that are individually fabricated for the separate job site installation. In addition to the uses of truss systems in permanent building installations, a more recent and extensive use of trusses has developed in connection with the fabrication of roof and deck forms for reinforced concrete construction. In such usage trusses of selected length have been used as supports for a section of deck or roof forms. Such sectional forms are intended to be used repeatedly at a job site, and, accordingly, the truss and form combination provides an assembly that may be moved conveniently as a unit from first pour site to subsequent pour locations.

Since the truss system and forms are intended for multiple reuse, efficient force transmitting fasteners that may be speedily applied or removed are highly beneficial. In previous reusable truss systems, conventional bolts have been used. At times of assembly, disassembly or storage, the threads of such bolts are often damaged, and repeated reuse, accordingly, becomes impractical and inefficient. At a construction site the fasteners are often driven into place and excessive damage is incurred due to misfit, misalignment and to preload conditions. Since a poor fit between holes and fasteners resulting either from initial design deficiencies or later mishandling will seriously impair the load capabilities of the truss system, the present fastener improvements are highly desirable and beneficial.

SUMMARY OF THE INVENTION

Briefly stated, the present invention provides a truss system in which the trusses to be used in permanent building installations or as form supports can be fabricated at the job site through use of standard components to meet widely varying requirements. Chords, struts, coupler and brace element pieces may be combined with the same or inter-fitting components to provide chords and struts of shorter or extended operative length. Through use of close inter-fitting and efficient load transmitting joints, the assembled trusses may be used to span long or short distances and to withstand widely varying load requirements. Fastener openings are provided on a rigidly controlled schedule to assure efficient intercoupling of components. The present invention provides bolt fasteners, drift pin extensions and bolt couplers of design to facilitate element interconnection or disassembly by impart hammer blows directed at the bolt head or at a small end of a tapered drift pin. Threaded nuts, drift pin extensions and couplers providing element retention features have undercut threads to facilitate full engagement with fewer turns to assure proper and continued interengagement between the fastener and truss elements.

BRIEF DESCRIPTION OF THE DRAWINGS

FIG. 4 is a perspective view illustrating wrench usage of the drift pin, FIG. 5 is a cross-sectional elevation similar to that of FIG. 2 showing use of the drift pin, FIG. 6 is a cross-sectional elevation of a truss bolt coupler, and FIG. 7 is a cross-sectional elevation in partial section showing use of such coupler.

DESCRIPTION OF THE PREFERRED EMBODIMENTS

Figure 1:
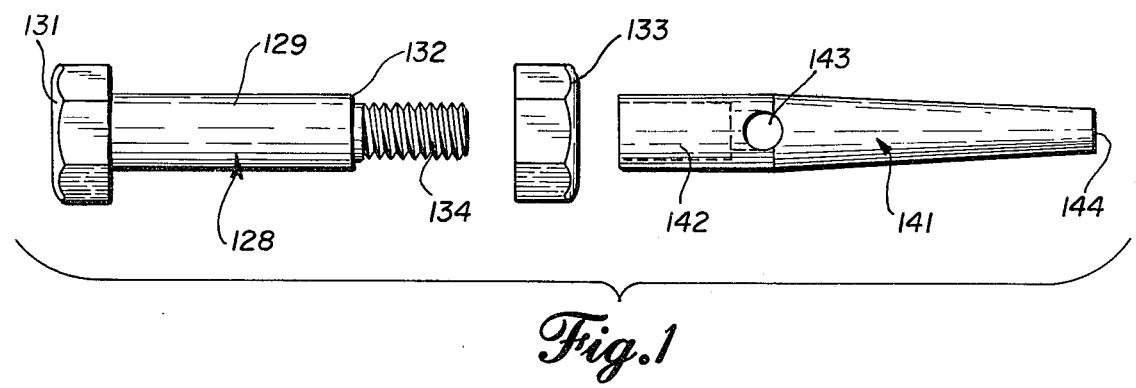
FIG. 1 is an exploded side elevation showing features of a truss bolt and of a drift pin attachment therefor.
Figure 2:
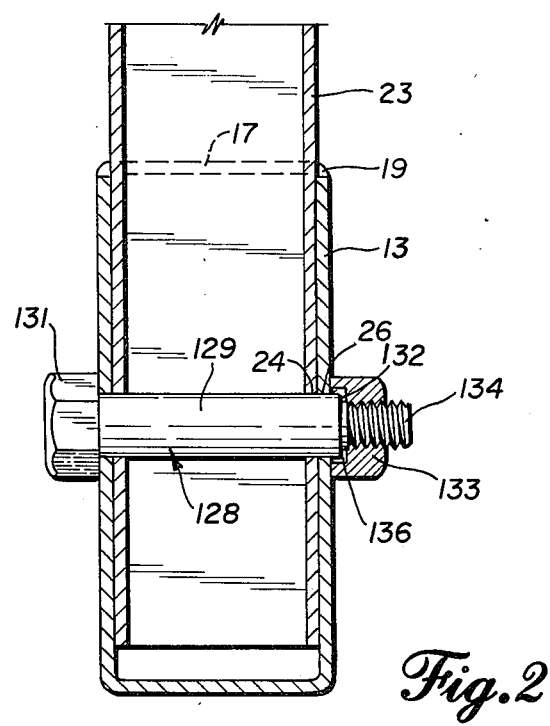
FIG. 2 is an end cross-sectional elevation showing further features of said truss bolt pin and its installation.

A preferred type of truss bolt or pin 128 is shown in FIGS. 1 and 2. This type of non-standard bolt is used to join a chord component of a truss system, such as chord 13, and a standard strut 23 in operative position with the strut 23 inserted through an opening 19 provided in the top surface 17 of the rectangular tubing chord. As illustrated, the shank 129 of bolt 128 extending between the head 131 and the end shoulder 132 is of length corresponding to the exterior width of the chord 13. A nut 133 is provided for application on the threads 134 which are themselves of diameter less than the shank diameter. Since the nut itself has a recess 136 of size adequate to accommodate the shank shoulder 132, the bolt 128 is held securely in position, and a tight engagement having full bearing support is provided. The bolt receiving holes 26 and 24 in the chord 13 and strut 23 are actually of a size slightly smaller than the diameter for the shank 129. Accordingly, the bolts 128 are usually driven into engagement to assure the desired full bearing contact.

A drift pin extension 141, as shown in FIG. 1, is used to facilitate alignment of these and other bolt receiving holes. Drift pin extension 141 has a socket end 142 that is threaded and adapted for mating engagement with the threads 134 of the bolts 128. When the trusses are being assembled, the drift pin extension 141 will be threaded on the bolt 128 as shown in FIG. 5, and the bolt and drift pin will then be driven into their positions of engagement. A rod may be inserted through the cross holes 143 provided through the body of drift pin extensions 141 to facilitate removal of the drift pin extension from the bolts 128 so that the recess nuts 133 may then be placed. When the trusses are to be disassembled or when the length of the trusses is to be shortened or increased, the drift pin extensions 141 can again be applied to the bolts 128 so that hammer blows may be directed against the ends 144 of the extensions 141 to facilitate removal of the bolts 128.

In order to assure the attainment of an efficient total truss structure, the size of the bolts, drift pin extensions and of the holes provided in the chord and strut components is closely regulated. The holes 26 through the chord 13 and the holes 24 through the end of the strut 23 are of a closely regulated diameter adapted to receive and snugly engage the shank 129 of the truss bolts 128. Preferably, the truss bolts 128 are of distinctive diameter that will not ordinarily be available in common bolt sizes. For the truss components illustrated, a shank diameter of just less than one inch has been successfully used. The diameter of the openings 24 and 26 should preferably be just slightly smaller than the truss bolts 128 to provide an interference fit of approximately 0.003 inches. With this type of interference fit the truss bolts and drift pins must be driven into and out of engagement, and good bearing characteristics are, accordingly, provided when the truss components are assembled.

Figure 3:
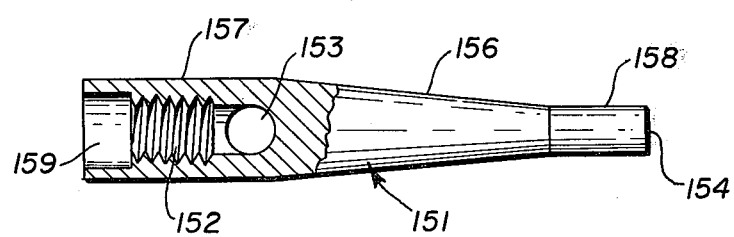
FIG. 3 is a side elevation in partial section showing features of a drift pin extension.

A modified type of drift pin extension 151 is shown in FIGS. 3, 4 and 5. This improved extension 151 again has a generally tapered body 156 that interconnects end cylindrical sections 157 and 158. Section 157 is of larger diameter corresponding to the diameter for the bolt shank 129. The tip section 158 is of considerably smaller diameter so that the tip of the truss bolt and drift pin extension can be introduced through poorly aligned holes to bring such holes into alignment as the combination truss bolt — drift pin is driven by hammer blows into its proper position. As in the previous drift pin extension 141, internal threads 152 are provided in the enlarged cylindrical end 157. Those threads, however, are undercut to provide a recess 159 that is of internal diameter larger than the external diameter for the threads 134 on the truss bolts 128. With this arrangement several turns of threads are eliminated, and it is no longer necessary to rotate the drift pin extension 151 the same number of turns that would be required for bringing the drift pin extension 141 into position of full engagement. Since fewer turns are necessary, the cylindrical section 156 can be readily brought into position of aligned engagement with the shank 129 of the truss bolts 128. A cross hole 153 is again provided to facilitate turning of the extension 151. In this particular embodiment, the cylindrical tip end 158 is of size to be engaged through the cross opening 153. Accordingly, one drift pin extension can be engaged in another as illustrated in FIG. 4 to be used as a wrenching handle to facilitate application or removal of the drift pin extensions from the truss bolts. The application and removal of the truss bolts 128 is carried out in the previously described manner. When truss components are being assembled, the extension 151 will be threaded on the end of a truss bolt 128. The end 158 of smaller diameter will be passed into engagement through paired openings 26 and 24, and thereafter hammer blows will be directed at the bolt head 131. Since the holes 24 and 26 are of smaller size than the diameter of the end 157 and of the bolt shank 129, a secure fit will be obtained. After the bolt 128 is moved to position of full engagement as shown in FIG. 5, the drift pin extension 151 will be removed, and an undercut nut 133 can then be brought into position as shown in FIG. 2. When a truss is to be disassembled, the drift pin extensions 141 or 151 will again be engaged to exposed threads 134 of the truss bolts 128, and thereafter hammer blows can be directed against the ends 144 or 154 to drive the bolts out of engagement.

The cross holes 143 and 153 in the drift pin extensions 141 and 151 should be disposed in position to intercept the pilot bore that would be drilled for the threads 142 or 152. With such arrangement, chips and particles derived as the threads are cut can escape through the holes 143 or 153, and the threading operation will, accordingly, be more efficiently accomplished. If taps are used to form the threads, less breakage of the taps will be encountered.

The combination of a truss bolt and a drift pin extension in joined relationship is not only useful to provide alignment for mated holes in structural components, but it also provides a convenient handle type tool that may be used to adjust screw jacks, turnbuckles and other positioning devices that are used at construction sites.

FIG. 6 illustrates a coupler 161 that may be beneficially used in conjunction with the truss bolts 128 when trusses of heavier capacity are to be assembled. The coupler 161 has internal threads 162 of size adapted to engage the threads 134 of the truss bolts 128. The coupler 161 has recesses 168 and 169 undercutting the threads at each end of the coupler. The external cylindrical shape of the coupler at 167 is of size and diameter corresponding to the diameter of the bolt shank 129. A taper section 166 is provided at an initially outer end so that a bolt 128 with the coupler 161 attached can be driven through mating holes 24 and 26 as the trusses are being assembled. The coupler 161 is of a length so that it may be used within a truss chord 13 in the manner illustrated in FIG. 7. When the truss bolts 128 are used to make a truss assembly in which the struts 23 are doubled as illustrated, the shoulders 132 for the bolts 128 will extend into the interior of the chord elements 13. The coupler 161 is then made of a length to span the distance between such in-place shoulders, and, accordingly, the coupler when fully engaged on the bolt threads 134 tends to hold the bolts in place with the shoulders 132 extending through the doubled structures. The undercut recesses 168 and 169 again facilitate quick engagement of the coupler to the bolts, since the threads are removed in the undercut sections, and a full engaged condition is obtained with fewer rotations of the coupler or of the bolts 128.

I claim:

1. A truss bolt and drift pin combination for use in connection with the fabrication of truss systems comprising a truss bolt having a shank of length corresponding to the overall width of components to be joined, a head at one end of the shank, a shoulder at the opposite end of said shank, a threaded section on said bolt in position past said shoulder of size smaller than the size of said shank whereby the threads will not come into engagement with surfaces of the components to be joined, a drift pin extension for use with said truss bolt, a tapered exterior surface on said extension of size increasing gradually to a size corresponding to the size of said bolt shank, said drift pin extension at this larger end providing a mating surface for close engagement with the shoulder provided by said bolt shank and a longitudinally disposed central bore, and threads in said bore whereby the drift pin extension may be engaged to the threaded section of said bolt for the protection of said threads and to provide with said bolt a drift pin combination having a continuous transitional exterior surface facilitating forced placement of said truss bolt, said drift pin extension further providing a cross hole disposed transversely through the body thereof in position at the bottom of said central bore and of diameter corresponding to the minor diameter for said threads to facilitate the cutting of said threads during manufacture and the subsequent user removal of the drift pin extension after the truss bolt has been set, and further comprising a tip section at the smaller end of said drift pin extension, said tip section being of size and length for insertion through said cross hole whereby one drift pin extension may be used for wrenching action on another.

2. The truss bolt as set forth in claim 1 wherein said central bore further provides an undercut recess that fully eliminates a plurality of said threads whereby full engagement or disengagement of said drift pin extension may be accomplished with fewer turns.

* * * * *